United States Patent [19]
Nibu

[11] Patent Number: 5,866,409
[45] Date of Patent: Feb. 2, 1999

[54] GARBAGE FERMENTING APPARATUS

[75] Inventor: Kazuo Nibu, Tondabayashi, Japan

[73] Assignee: N-I-Techno Co., LTD, Osaka, Japan

[21] Appl. No.: 914,772

[22] Filed: Aug. 20, 1997

[51] Int. Cl.⁶ .................................................. C12M 3/00
[52] U.S. Cl. .................................... 435/290.2; 435/290.4
[58] Field of Search ........................... 435/290.1, 290.2, 435/290.3, 290.4; 71/9, 11, 15

[56]  References Cited

U.S. PATENT DOCUMENTS

| | | | |
|---|---|---|---|
| 3,930,799 | 1/1976 | Eweson | 435/290.3 |
| 5,169,782 | 12/1992 | Murphy et al. | 435/290.3 |
| 5,244,804 | 9/1993 | Horkan et al. | 435/290.3 |
| 5,710,042 | 1/1998 | Shindo et al. | 435/290.1 |

*Primary Examiner*—David A. Redding
*Attorney, Agent, or Firm*—Armstrong, Westerman Hattori, McLeland & Naughton

[57]  ABSTRACT

A garbage fermenting apparatus is provided which can process a mixture of fermentative garbage and non-fermentative garbage. The fermentative garbage includes foodstuffs such as vegetables, meats, processed foods, etc. The non-fermentative garbage includes such things as the packages of packaged foods, plastic trays, vinyl, cellophane, chopsticks, etc. Once the fermentative and non-fermentative garbage are processed, the garbage fermenting apparatus automatically divides the processed matter into a fully-matured powder and a non-fermentative matter. The garbage fermenting apparatus includes: a full-maturation tank on the downstream side of the fermentation tank; a first heater attached to an outer face of the tank wall of the fermentation tank; a second heater attached to an outer face of the tank wall of the full-maturation tank; a first impeller which brakes and stirs the fermentative garbage and the non-fermentative garbage in the fermentation tank; a second impeller which stirs the fermentative garbage and the non-fermentative garbage in the full-maturation tank; and a sieve which divides fully-fermentation processed matter into fully-matured powder and non-fermentative matter.

17 Claims, 5 Drawing Sheets

GARBAGE FERMENTING APPARATUS

BACKGROUND OF THE INVENTION

1. Field of the Invention

The present invention generally relates to a garbage fermenting apparatus and more particularly, to a garbage fermenting apparatus which processes both fermentative garbage and non-fermentative garbage in a short period of time and then, divides the processed fermentative garbage and non-fermentative garbage into both a fully-matured powder and a non-fermentative component.

2. Description of the Related Art

In a conventional apparatus wherein excrement of livestock is fermented and discharged from a stock-breeding facility, (such as fish refuse discharged from fish markets and fish stores, vegetable refuse discharged from markets and restaurants, garbage discharged from households, hotels, and supermarkets, and other kinds of waste in a short period of time), the garbage fed into the apparatus is heated by hot air from either a blower or a hot air type heater, and the temperature of the garbage is controlled by changing the amount of air. Some known garbage fermenting apparatuses are also provided with a device for heating charged gas by heat exchange with exhaust gas heated by fermentation heat.

However, in the conventional garbage fermenting apparatuses described above, some items cannot be processed, such as, for example, cellophane, vinyl, plastic trays, food packed with synthetic or plastic materials, and caps of bottled beverages. These non-processable items comprise non-fermentative garbage, which must be removed by human hands prior to the fermentative garbage and non-fermentative garbage being fed into the garbage fermenting apparatuses, so that only fermentative garbage is fed into the apparatuses. The necessity for human labor to remove the non-fermentative garbage is inconvenient. In an apparatus which sends hot air directly into a fermentation tank, a necessary amount of air for heating is more than ten times the amount of air necessary for fermentative microorganisms. Furthermore, those apparatuses which sends hot air directly into a fermentation tank also require vaporization of water and large scale deodorization equipment for the exhaust gas. Although a hot air supply opening is provided at the downstream side of the fermentation tank to improve the heat conduction effect, the change of the amount of air for temperature control clogs the opening, and a stable operation over a long period of time is cannot be achieved.

It is therefore an object of the present invention to provide a garbage fermenting apparatus which processes a mixture of fermentative garbage and non-fermentative garbage, which divides the processed fermentative garbage and non-fermentative garbage into both a fully-matured powder and a non-fermentative matter, after the relatively short fermentation process.

It is also an object of the present invention to provide a garbage fermenting apparatus which has equipment of a relatively small scale and which has long and stable operation.

SUMMARY OF THE INVENTION

A garbage fermenting apparatus comprising: a closed fermentation tank having an open-close feeding port to which fermentative garbage and non-fermentative garbage are fed; a closed full-maturation tank having a garbage ejection port and arranged on a downstream side of the fermentation tank; a first heater, arranged on an outer face of a tank wall of the fermentation tank, for heating an inside of the fermentation tank through the tank wall of the fermentation tank; a second heater, arranged on an outer face of a tank wall of the full-maturation tank, for heating an inside of the full-maturation tank through the tank wall of the full-maturation tank; a first impeller for breaking and stirring the fermentative garbage and the non-fermentative garbage in the fermentation tank; and a second impeller for stirring the fermentative garbage and the non-fermentative garbage in the full-maturation tank.

BRIEF DESCRIPTION OF THE DRAWING FIGURES

The present invention will be described with reference to the accompanying drawing figures, in which.

DESCRIPTION OF THE PREFERRED EMBODIMENTS

Preferred embodiments of the present invention will now be described with reference to the accompanying drawing figures.

Figure 1:
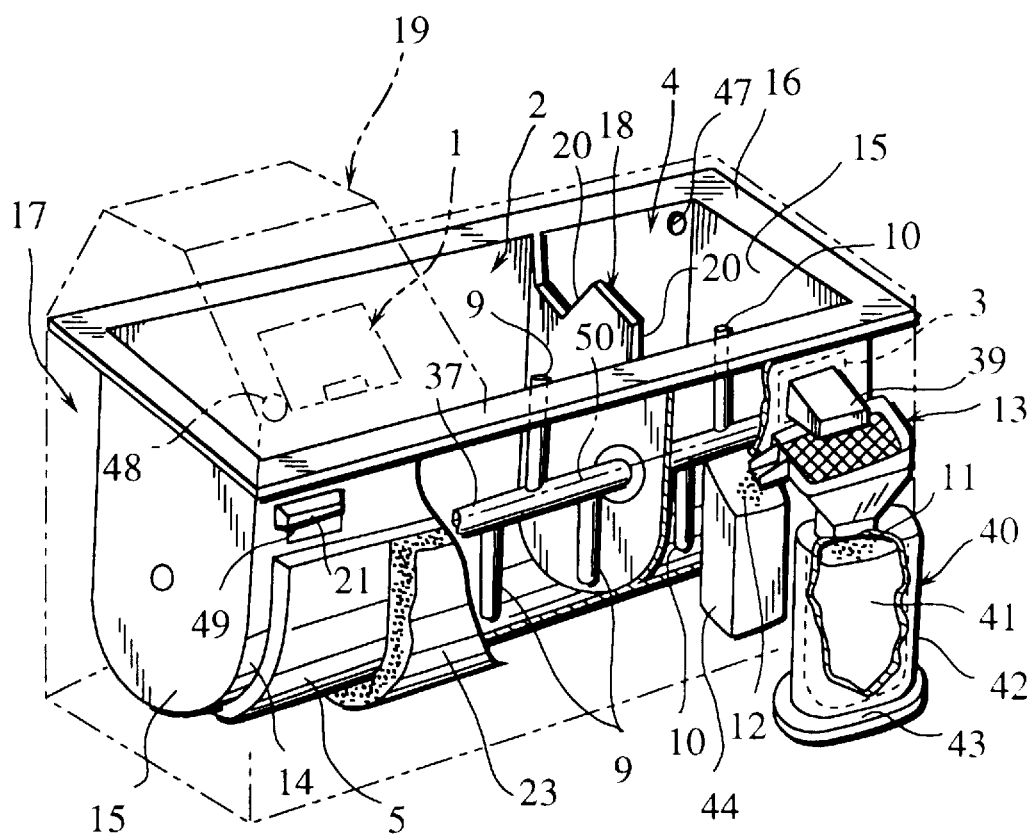
FIG. 1 is a perspective view showing a preferred embodiment of the present invention with a portion cut away for clarity.
Figure 2:
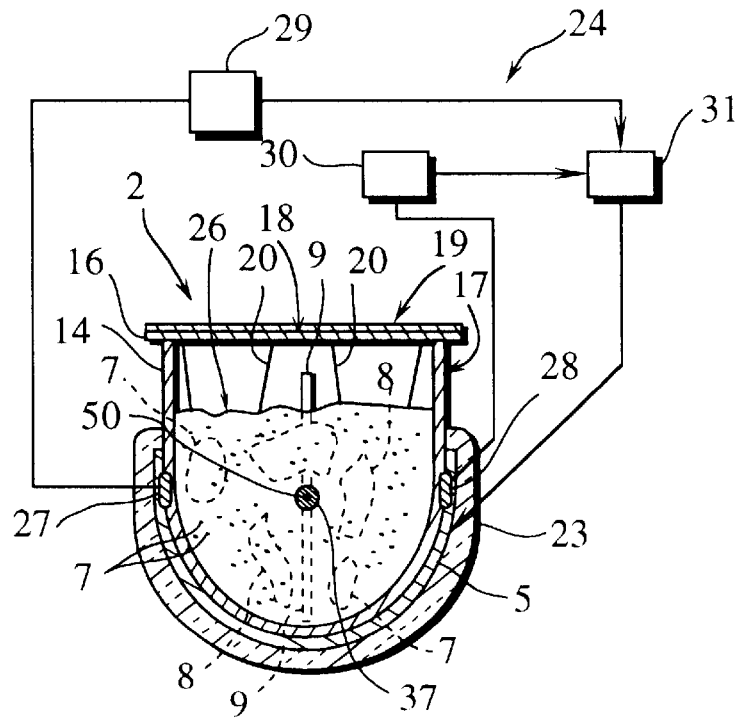
FIG. 2 is a cross-sectional view of a fermentation tank.
Figure 3:
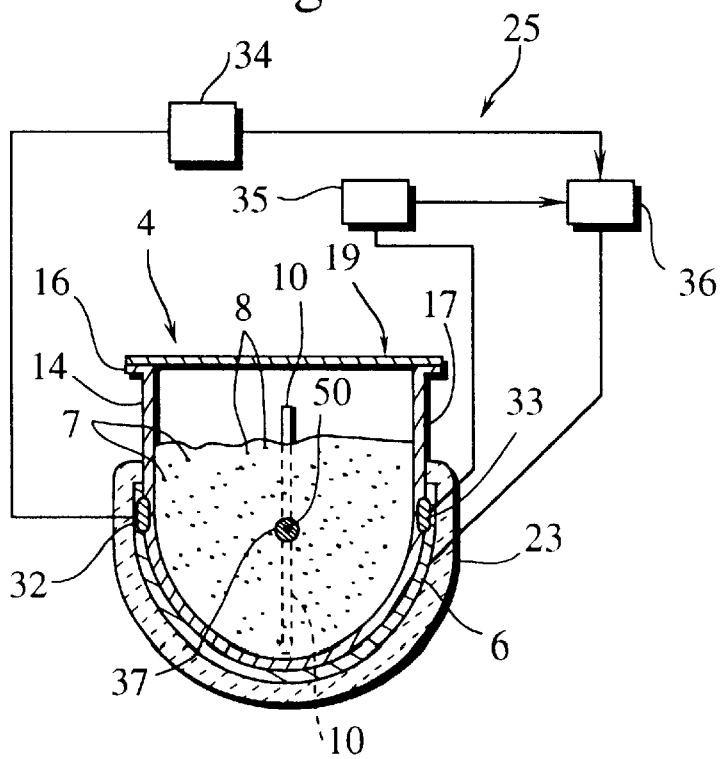
FIG. 3 is a cross-sectional view of a full-maturation tank

A garbage fermenting apparatus, as shown in FIG. 1, FIG. 2, and FIG. 3, includes a closed fermentative tank 2 having an openable and closeable feeding port 1. Both fermentative garbage and non-fermentative garbage are fed to the feeding port 1. A closed full-maturation tank 4 is arranged at a downstream side of the fermentation tank 2. The closed full-maturation tank 4 has a garbage ejection port 3 which is provided with an automatic open-close lid. A first heater 5 is attached to an outer face of the tank wall of the fermentation tank 2. The first heater 5 heats an inside of the fermentation tank 2 through the tank wall of the fermentation tank 2. A second heater 6 is attached to an outer face of the tank wall of the full-maturation tank 4. The second heater 6 heats an inside of the full-maturation tank 4 through the tank wall of the full-maturation tank 4. A first impeller 9 (i.e., set of rotating blades) breaks and stirs fermentative garbage 7 and non-fermentative garbage 8 in the fermentation tank 2. A second impeller 10 (i.e., set of rotating blades) stirs fermentative garbage 7 and non-fermentative garbage 8 in the full-maturation tank 4. A sieve 13 divides fully-fermentative-processed matter, ejected from the full-maturation tank 4 into a fully-matured powder 11 and a non-fermentative matter 12.

The fermentation tank 2 and the full-maturation tank 4 are formed with a curved wall portion 14 having a U-shaped cross-sectional configuration. Two vertical wall portions 15 are arranged at both end portions of the curved wall portion 14. An outer tank wall 17 has an outer brim portion 16 which is formed at the upper end edge of the curved wall portion 14 and the vertical wall portions 15. A partition wall 18, having two overflow ports 20 at the top thereof, divides the inside of the outer tank wall 17 into two parts. An upper lid 19 covers the open top adjacent to the outer tank wall 17.

The fermentation tank 2 and the full-maturation tank 4 are adjacent to each other. The partition wall 18, through the top of which the overflow ports 20 are notched, is arranged between the fermentation tank 2 and the full-maturation tank 4. The capacity of the fermentation tank 2 is arranged to be larger than the capacity of the full-maturation tank 4. For example, the capacity of the fermentation tank 2 is approximately 4 to 6 times larger than the capacity of the full-maturation tank 4. An intake port 21 is arranged on the upper portion of a part of the outer tank wall 17 which forms the fermentation tank 2. A fan heater, for air intake 49, is arranged near the intake port 21. An air outlet port 47 is arranged on the outer tank wall 17.

The garbage fermenting apparatus also includes a piece of heat insulating material 23 surrounding the outer side of the first heater 5 and the second heater 6, both of which are attached to the outer face of the tank wall of the fermentation tank 2 and the full-maturation tank 4, respectively. Although both the first heater 5 and the second heater 6 are surrounded by one piece of heat insulating material 23, the first heater 5 and the second heater 6 may be separately surrounded by first and second pieces of heat insulating material 23, respectively. A sensor 48, which detects the opening and closing of the feeding port 1, is arranged near the feeding port 1. When the feeding port does not open and close for an amount of time longer than a predetermined time (for example, 48 hours), the sensor 48 is electrically connected to each of a motor for stirring, a blower for ventilation, and a timer which automatically turns off a power source to both the first heater 5 and the second heater 6. After the power source is automatically turned off, the timer is reset by opening and closing the feeding port 1, and normal operation recommences.

As shown in FIG. 2, a temperature controlling means 24, for keeping the optimum fermentation temperature in the fermentation tank 2, is provided. The temperature controlling means 24 consists of a first temperature detector 27, a second temperature detector 28, a first temperature setter 29, a second temperature setter 30, and a heater controller 31. The first temperature detector 27 detects the temperature of garbage 26 (fermentative garbage 7) in the fermentation tank 2 and sends temperature signals to the first temperature setter 29. The second temperature detector 28, attached to the inner face of the tank wall heated by the first heater 5, detects the temperature of the inner face of the tank wall and sends temperature signals to the second temperature setter 30. The first temperature setter 29 and the second temperature setter 30 have set values of maximum and minimum temperature, respectively, and control the heater controller 31 which turns on and off the first heater 5.

While the temperature of the tank wall (i.e., the shell) is below the set value of the maximum temperature of the first temperature setter 29, the first heater 5 is turned off when the temperature of the inner face of the tank wall reaches the set value of the maximum temperature of the second temperature setter 30. The first heater 5 is turned off again when the temperature of the inner face of the tank wall goes below the set value of the minimum temperature of the second temperature setter 30. If the temperature of the tank wall exceeds the set value of the maximum temperature of the first temperature setter 29, the first heater 5 is turned off no matter what the temperature signals from the second temperature setter 30, and turned on again when the temperature of the tank wall goes below the set value of the minimum temperature of the first temperature setter 29.

The set values of the maximum and the minimum temperature of each of the temperature setters 29 and 30 are arranged to keep the processed matter at the optimum fermentation temperature. For example, the temperature of the processed matter, namely, the set value of the maximum temperature of the first temperature setter 29, is preferably arranged to be below 90° C. for survival of the microorganisms. The set value of the minimum temperature is above 40° C. for full activity of the fermentative microorganisms. The temperature of the inner face of the tank wall, namely, the set value of the maximum temperature of the second temperature setter 30, is preferably arranged to be below 100° C., whereas the set value of the minimum temperature is above 40° C.

As shown in FIG. 3, a temperature controlling means 25, which controls the temperature in the full-maturation tank 4, is provided. The temperature controlling means 25 has a similar structure to the structure of the temperature controlling means 24 and includes a first temperature detector 32, a second temperature detector 33, a first temperature setter 34, a second temperature setter 35, and a heater controller 36. The second heater 6 is controlled in a manner similar to the way the first heater 5 is controlled. The calorific value of the first heater 5 is arranged to be higher than the calorific value of the second heater 6. More specifically, the calorific value of the first heater 5 is preferably arranged to be 2 to 5 times higher than the calorific value of the second heater 6. For example, nine heaters of 1.3 KW are used as the first heater 5, and nine heaters of 0.3 KW are used as the second heater 6. Heaters of homogeneous heating types, such as plate heaters or water jacket heaters, may be used.

As shown in FIG. 1, FIG. 2, and FIG. 3, the first impeller 9 is formed on a side of a shaft portion 37 nearest the fermentation tank 2, is arranged through both the fermentation tank 2 and the full-maturation tank 4, and is rotated around a horizontal shaft center 50 by a common driving source connected with the shaft portion 37. The second impeller 10 is formed on the side of the shaft portion 37 nearest the full-maturation tank 4.

Blades of the first impeller 9 and the second impeller 10 are formed in a shape (for example, belt-plate shape or stick shape) so as to be able to break a mass of the fermentative garbage 7 (such as vegetables, meats, processed foods, etc.) and the non-fermentative garbage 8 (such as, for instance: food packages of packaged foods, such as vegetables, ham, cheese, and sausages; cellophane; vinyl; plastic trays; chopsticks; caps of bottled beverages; and other materials). The first impeller 9 and the second impeller 10 may be formed with plural stirring paddles, having a slim stick configuration, formed on the shaft portion 37 and ribbon-shaped stirring fins, attached to end portions of the stirring paddles, in spiral configuration.

As shown in FIG. 1, an ejection chute 39 is attached to the ejection port 3 of the full-maturation tank 4, and an open-topped sieve 13 is arranged below the end opening portion of the ejection chute 39. A bagging machine 40, which measures and bags a predetermined weight of the fully-matured powder 11, is connected to the sieve 13. The bagging machine 40 includes: a bagging portion 42, which is arranged below the sieve 13, for storage of a fully-matured powder bag 41; and a weigher 43 which is arranged below the bagging portion 42. A non-fermentative garbage box 44 is arranged near the sieve 13.

Figure 4:
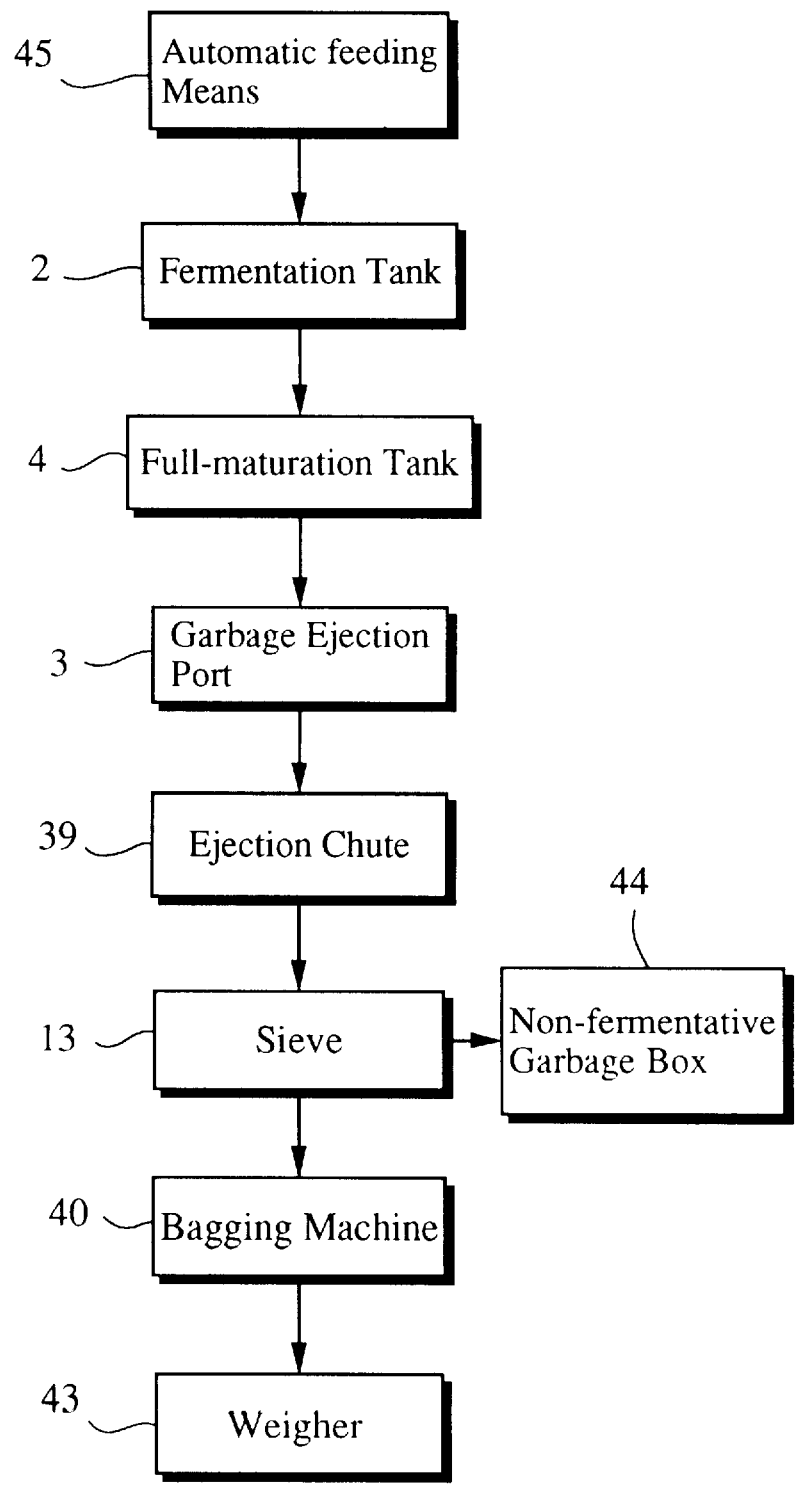
FIG. 4 is a block diagram showing the construction of the entire apparatus.

The garbage fermenting apparatus, as shown in FIG. 4 also has an automatic feeding means 45 for automatically feeding the garbage to the fermentation tank 2.

Figure 5:
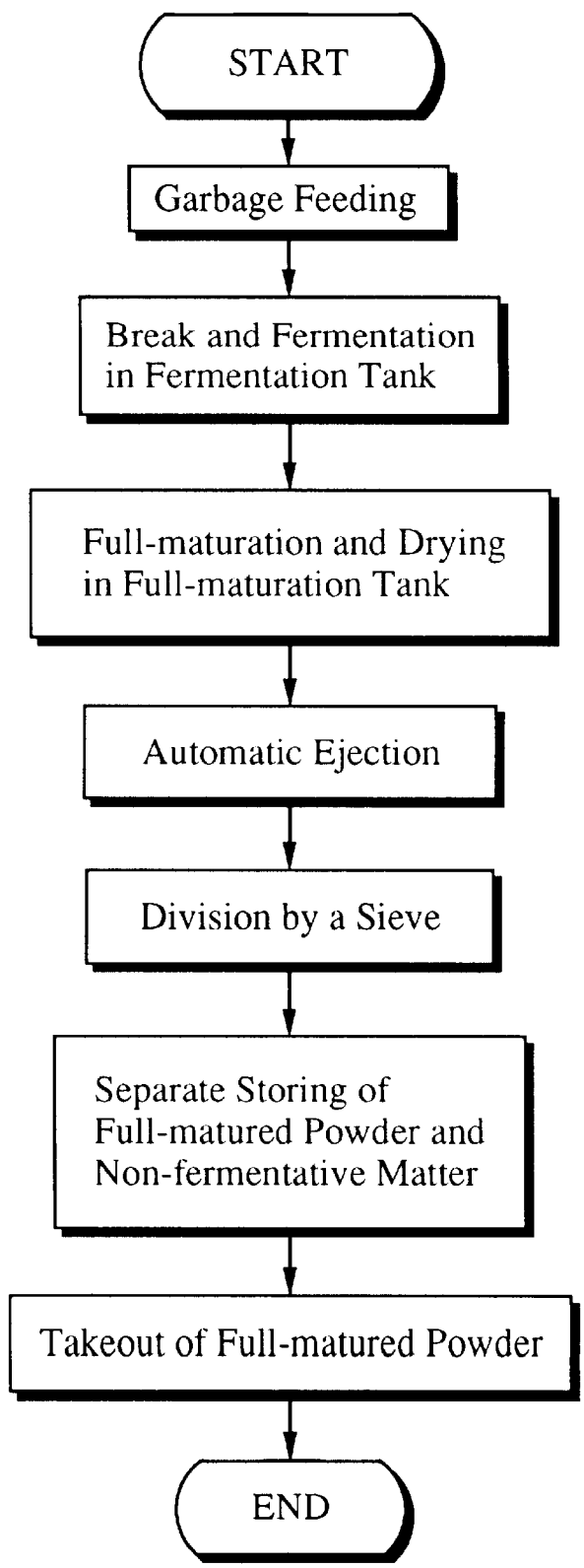
FIG. 5 is a flowchart of the garbage fermenting process.

Next, the functional process, of the garbage fermenting apparatus, of the present invention, will be described with reference to a flowchart, as shown in FIG. 5. First, a mixed mass of the fermentative garbage 7 and the non-fermentative garbage 8 is fed into the fermentation tank 2 with the automatic feeding means 45, as shown in FIG. 4. Microorganisms, for use in the fermentation process, are mixed with the mass of garbage. Sugar decomposing bacteria, protein decomposing bacteria, cellulose decomposing bacteria, and lignin decomposing bacteria are used as the fermentative microorganisms. A fermentative material, in which inorganic basic matter, natural organic matter, and medicines are combined, is also preferably mixed with the garbage. Moreover, it is desirable to mix microorganisms, having a deodorization effect, with the garbage.

As shown in FIG. 1 and FIG. 2, the first impeller 9 in the fermentation tank 2 breaks and stirs the garbage. That is to say, the first impeller 9 breaks and stirs a mass of fermentative garbage 7 and non-fermentative garbage 8 (such as, for instance: food packaging materials of food such as of vegetables, ham, cheese, and sausages; cellophane; vinyl; plastic trays; chopsticks; caps of bottled beverages; and other materials). The first impeller 9 repeats both normal rotations for 3 to 30 minutes and reverse rotations for the same duration. There is an interval of several tens of seconds between the normal rotations and the reverse rotations. The fermentation process of the fermentative garbage 7 is promoted by the optimum fermentation temperature in the fermentation tank 2 controlled by the first heater 5 and the temperature controlling means 24 from the beginning of the process. Preferably, the temperature of the inner wall face of the tank is kept at above 40° C. and below 100° C., according to the kind of fermentative garbage 7.

Fermentation-processed matter (garbage) overflows the fermentation tank 2 and enters the full-maturation tank 4 through overflow ports 20. The fermentation-processed matter is stirred by the second impeller 10, and is fully matured at the optimum fermentation temperature controlled by the second heater 6 and the temperature controlling means 25. The fully matured garbage overflows the full-maturation tank 4 and enters the sieve 23 through the garbage ejection port 3 and the ejection chute 39. The processed matter overflows the full-maturation tank 4 and enters the sieve 13, while the garbage ejection port 3 is open for 2 to 4 hours after the feeding of the processed matter. The fully-fermentation-processed matter is divided into the fully-matured powder 11 and the non-fermentative matter 12, with the fully-matured powder 11 being stored in the fully-matured powder bag 41 in the bagging machine 40, and the non-fermentative matter 12 being stored in the non-fermentative garbage box 44. The sieve 13 works while the garbage ejection port 3 is open, and does not work while the garbage ejection port 3 is closed. If the fully-matured powder bag 41 reaches a predetermined weight (25 to 30 Kg for example), the weigher or scale 43 automatically shuts the garbage ejection port 3, and beeps or turns on a warning light. An operator takes out the fully-matured powder bag 41. After that, the operator puts a vacant fully-matured powder bag 41 into the bagging machine 40, and finally, opens, the garbage ejection port 3. Thus, the processed matter is completely taken out either when a processing time of 2 to 4 hours is up or when ejection of the processed matter is completed.

Breaking, stirring, and retaining heat are preferably continued for 24 to 48 hours in each of the fermentation tank 2 and the full-maturation tank 4. The intervals between the normal rotation and the reverse rotation of the first impeller 9 and the second impeller 10 may be arranged to be 30 to 180 minutes according to the kind of the fermentative garbage 7 to be fermented.

The stirring may be continued for a long time (more than 48 hours) in a continuous stirring mode. In this case, a fan heater for air intake 49, near the intake port 21, is turned on. The processing ability of the apparatus is thereby doubled to handle bigger processing quantities, such as on weekends. Prevention effect of dewing in the fermentation process in winter of cold regions and fermentation promoting effect (prevention effect of elongation of the processing time) are also obtained.

As described above, a mixture of fermentative garbage 7 (i.e., food materials such as vegetables, meats, processed foods, etc.) and non-fermentative garbage 8 (i.e., food packages, of packaged foods, cellophane, vinyl, plastic trays, chopsticks, caps of bottled beverages, etc.) can be fed into the garbage fermenting apparatus of the present invention. The garbage is automatically divided into fermented fully-matured powder 11 and non-fermentative matter 12. Therefore, manual work to sort the garbage before the feeding thereof is not necessary. The fully-matured powder 11 is automatically bagged. The garbage can be successively fed every day, since the fermentative successively proceeds from the fermentation tank 2 to the full-maturation tank 4. Moreover, the processed garbage is removed as either manure or livestock feed (fully-matured powder 11) after a relatively short processing time of 24 to 48 hours. The removal of the manure or livestock feed can be done every day if the feeding of the garbage is done every day. Consequently, the garbage fermenting apparatus of the present invention contributes to a solution of garbage problems, reduction of energy use, and reuse of organic waste as manure. Also, the garbage fermenting apparatus of the present invention has a simple structure, a relatively small scale of equipment, long and stable operationality, and high maintainability. Furthermore, the garbage fermenting apparatus also reduces the energy consumption for heating. When the feeding port 1 does not open and close for a period of 48 hours, a motor for stirring, a blower for ventilation, the first heater 5, and the second heater 6 are all automatically turned off by the sensor 48, arranged near the feeding port 1, and the timer (not shown). Therefore, reduction of electric energy consumption and high safety are achieved.

Figure 6:
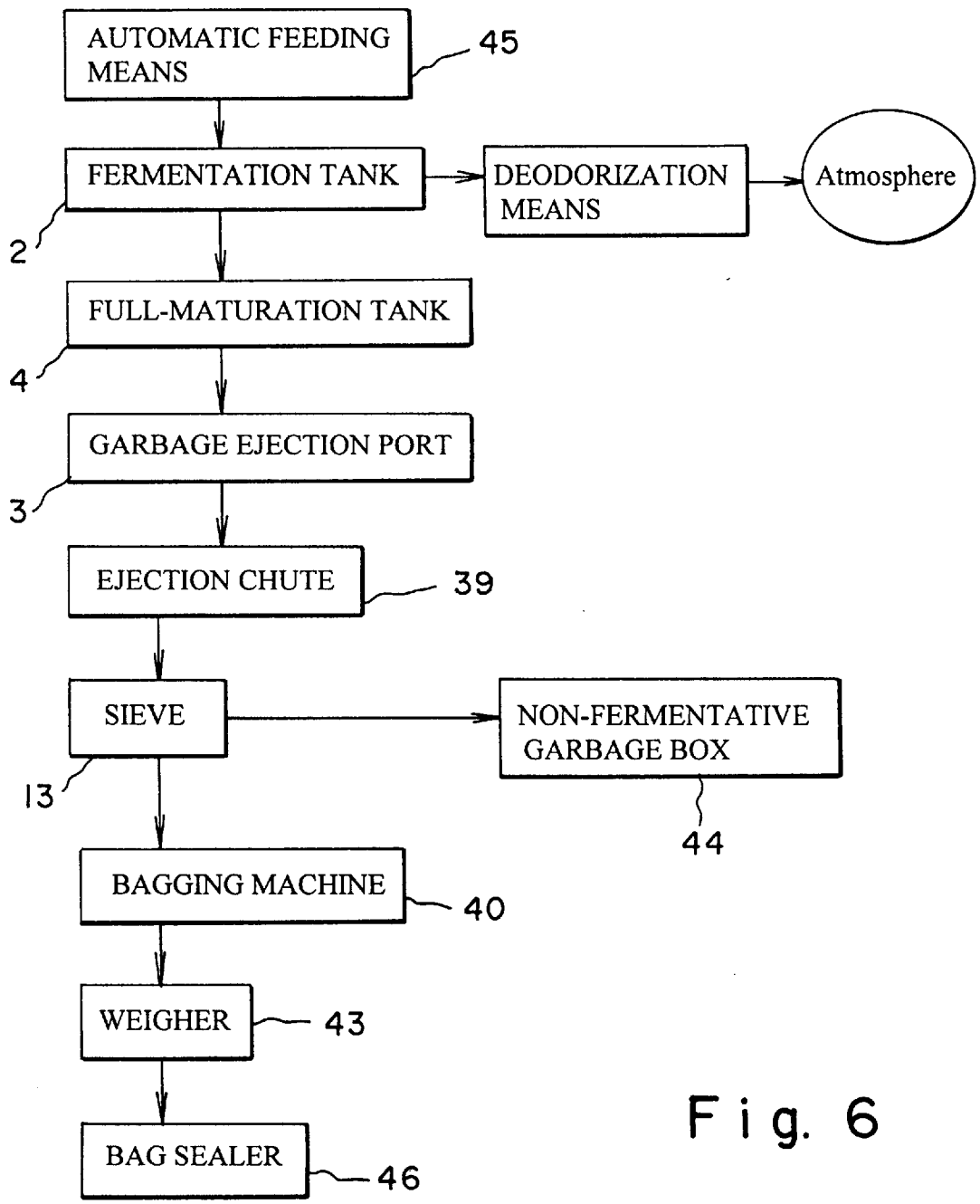
FIG. 6 is a block diagram showing the entire construction of another preferred embodiment.

Next, FIGS. 6 shows a block diagram of another preferred embodiment of the garbage fermenting apparatus relating to the present invention provided with a deodorization means 22, which is communicatingly connected to the fermentation tank 2, and a bag sealer 46, for sealing the bag in which full-matured powder is stored. The rest of the construction is similar to the structure shown in FIG. 1 through FIG. 5. The deodorization means 22 has a deodorization portion and an exhaust fan. The outside air is sucked into the fermentation tank 2 and the full-maturation tank 4 through an inlet port by the rotation of the exhaust fan. Gas loaded with vaporized water and odor from an exhaust port is led through the deodorization means 22, mostly deodorized, and discharged into the atmosphere. The bag sealer has, for example, a vinyl fusing sealer or a paper bag sewing machine. That is to say, a vinyl bag or a paper bag, used as the fully-matured powder bag, is sealed with fusing or sewing, respectively, of its opening after the fully-matured powder is stored.

The preferred embodiment of the present invention described above may be altered into another form. For example, a pH regulator feeding means may be arranged to feed pH regulator, when the pH of the garbage (fermentative garbage 7) deviates from the range of appropriate pH for fermentation. The automatic feeding means 45 may be omitted for manual feeding of garbage. Further, there may be some cases in which the deodorization means 22, the weigher 43, the bag sealer 46, and/or the sieve 13 are omitted.

While preferred embodiments of the present invention have been described in this specification, it is to be understood that the invention is illustrative and not restrictive, because various changes are possible within the spirit and indispensable features.

What is claimed is:

1. A garbage fermenting apparatus comprising:
   a closed fermentation tank partially covered by an upper lid having an openable and closeable feeding port to which fermentative garbage and non-fermentative garbage are fed;
   a closed full-maturation tank having a garbage ejection port, wherein said full-maturation tank is arranged on a downstream side of said fermentation tank;
   a first heater arranged on an outer face of a tank wall of said fermentation tank, wherein said first heater heats an inside of said fermentation tank through said tank wall of said fermentation tank;
   a second heater arranged on an outer face of a tank wall of said full-maturation tank, wherein said second heater heats an inside of said full-maturation tank through said tank wall of said full-maturation tank;
   a first impeller for breaking and stirring both said fermentative garbage and said non-fermentative garbage in said fermentation tank;
   a second impeller for stirring both said fermentative garbage and said non-fermentative garbage in said full-maturation tank;
   a garbage ejection chute extending radially outwardly from said garbage ejection port to an outside of said garbage fermenting apparatus; and
   a sieve, located adjacent said garbage ejection port, for separating processed matter ejected from said full-maturation tank into fully-matured powder and non-fermentative matter, wherein said sieve is connected a bagging machine and a weigher so that said fully-matured powder can be bagged to a predetermined weight.

2. The garbage fermenting apparatus as set forth in claim 1, wherein said fermentation tank and said full-maturation tank are adjacent to each other, and a partition wall, having overflow ports, is arranged between said fermentation tank and said full-maturation tank.

3. The garbage fermenting apparatus as set forth in claim 1, wherein a capacity of said fermentation tank is arranged to be larger than a capacity of said full-maturation tank, and a calorific value of said first heater is arranged to be higher than a calorific value of said second heater.

4. The garbage fermenting apparatus as set forth in claim 3, wherein a temperature controlling means is provided for keeping an optimum temperature for fermentation in said fermentation tank.

5. The garbage fermenting apparatus as set forth in claim 4, wherein said temperature controlling means includes first and second temperature setters and a heater controller.

6. The garbage fermenting apparatus as set forth in claim 3, wherein said calorific value of said first heater is between 2 to 5 times higher than said calorific value of said second heater.

7. The garbage fermenting apparatus as set forth in claim 6, wherein said first heater comprises nine heaters of 1.3 KW and said second heater comprise nine heaters of 0.3 KW.

8. The garbage fermenting apparatus as set forth in claim 3, wherein said capacity of said fermentation tank is between 4 to 6 times larger than said capacity of said full-maturation tank.

9. The garbage fermenting apparatus as set forth in claim 1, wherein a heat insulating material surrounds first heater arranged on said outer face of said tank wall of said fermentation tank and second heater arranged on said outer face of said tank wall of said full-maturation tank.

10. The garbage fermenting apparatus as set forth in claim 1, wherein said first impeller has plural blades connected to a shaft portion which extends through both said fermentation tank side and said full-maturation tank wherein said shaft portion is rotated around a horizontal shaft center by a common driving source connected to said shaft portion, and second impeller has plural blades connected to said shaft portion in said full-maturation tank.

11. The garbage fermenting apparatus as set forth in claim 10, wherein each blade of said plural blades of said first and second impellers have a central longitudinal axis such that said central longitudinal axis of a first blade of both first and second impellers is offset from said central longitudinal axis of an adjacent blade of said first and second impellers.

12. The garbage fermenting apparatus as set forth in claim 1, wherein said fermentation tank and said full-maturation tank are formed with a curved wall portion having a U-shaped cross section, two vertical wall portions arranged at both end portions of said curved wall portion, and an outer tank wall having an upper brim portion formed at upper end edges of both said curved wall portion and said vertical wall portions.

13. The garbage fermenting apparatus as set forth in claim 1, wherein an intake port is arranged at an upper portion of said tank wall of said fermentation tank.

14. The garbage fermenting apparatus as set forth in claim 1, wherein a fan heater for air intake is arranged near said intake port.

15. The garbage fermenting apparatus as set forth in claim 1, wherein an air outlet port is arranged on said tank wall of said full-maturation tank.

16. The garbage fermenting apparatus as set forth in claim 1, further comprising a sensor arranged near said openable and closeable feeding port for detecting an opening and a closing of said feeding port.

17. The garbage fermenting apparatus as set forth in claim 1, wherein said sensor is electrically connected to a motor for stirring, a blower for ventilation, and a timer means for automatically turning off a power source to said first and second heater such that when said sensor detects that said feeding port for has not been opened and closed for a predetermined period of time, said sensor turns on said motor, said blower, and said timer means.

* * * * *